United States Patent
Okazaki et al.

(10) Patent No.: US 10,354,036 B2
(45) Date of Patent: Jul. 16, 2019

(54) MODEL DATA GENERATION DEVICE, METHOD OF GENERATING MODEL DATA, MOUNTING REFERENCE POINT DETERMINATION DEVICE, AND METHOD OF DETERMINING MOUNTING REFERENCE POINT

(71) Applicant: YAMAHA HATSUDOKI KABUSHIKI KAISHA, Iwata-shi, Shizuoka (JP)

(72) Inventors: Shinichi Okazaki, Iwata (JP); Tsutomu Nakashima, Iwata (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 80 days.

(21) Appl. No.: 15/743,198

(22) PCT Filed: Jul. 15, 2015

(86) PCT No.: PCT/JP2015/070286
§ 371 (c)(1),
(2) Date: Jan. 9, 2018

(87) PCT Pub. No.: WO2017/009980
PCT Pub. Date: Jan. 19, 2017

(65) Prior Publication Data
US 2018/0203970 A1  Jul. 19, 2018

(51) Int. Cl.
*G06F 17/50* (2006.01)
*G06T 7/00* (2017.01)
(Continued)

(52) U.S. Cl.
CPC .......... *G06F 17/5068* (2013.01); *G06T 7/001* (2013.01); *H05K 13/04* (2013.01);
(Continued)

(58) Field of Classification Search
CPC . G06F 17/5068; G06F 17/5072; G06T 7/001; H05K 13/0815; H05K 13/04; G06K 9/00
(Continued)

(56) References Cited

U.S. PATENT DOCUMENTS 4,709,302 A * 11/1987 Jordan ................... H05K 3/306
165/80.2
5,518,410 A * 5/1996 Masami ............. H01R 13/2485
324/750.25
(Continued)

FOREIGN PATENT DOCUMENTS

JP S57-147245 A 9/1982
JP 02122556 A * 5/1990
(Continued)

OTHER PUBLICATIONS

Akira, Machine English Translation of Japanese Patent Document No. JP-2005-216889A, Published on Aug. 11, 2005, Machine translated by https://www.j-platpat.inpit.go.jp/p0200, on May 12, 2019. (Year: 2005).*
(Continued)

*Primary Examiner* — Phallaka Kik
(74) *Attorney, Agent, or Firm* — Studebaker & Brackett PC

(57) ABSTRACT

In a model data generation device configured to generate model data of an electronic component to be mounted on a printed board, the model data includes data about terminals to and data about a mounting reference point with respect to the printed board. The mounting reference point of the model data is determined by using first image data about an electronic component captured by a component recognition camera and second image data including information about pads of the printed board that overlap the terminals of the
(Continued)

electronic component and information about a mounting position of the electronic component on the printed board.

12 Claims, 16 Drawing Sheets

(51) Int. Cl.
*H05K 13/04* (2006.01)
*G06K 9/00* (2006.01)
*H05K 13/08* (2006.01)

(52) U.S. Cl.
CPC ..... *H05K 13/0815* (2018.08); *G06F 17/5072* (2013.01); *G06K 9/00* (2013.01)

(58) Field of Classification Search
USPC ........ 716/119, 137, 136; 382/147, 151, 152, 382/154
See application file for complete search history.

(56) References Cited

U.S. PATENT DOCUMENTS

| | | | | |
|---|---|---|---|---|
| 5,764,488 | A * | 6/1998 | Silva | H05K 1/0295 257/723 |
| 6,064,758 | A | 5/2000 | Jin | |
| 6,861,290 | B1 * | 3/2005 | Moden | H01L 21/485 257/E21.503 |
| 2008/0130255 | A1 * | 6/2008 | Noguchi | H05K 1/0295 361/771 |
| 2009/0032915 | A1 * | 2/2009 | Cherian | H01L 21/4853 257/666 |
| 2009/0207573 | A1 * | 8/2009 | Soh | H05K 3/303 361/760 |
| 2010/0325594 | A1 * | 12/2010 | Sakata | G06F 17/5036 716/106 |
| 2011/0090662 | A1 * | 4/2011 | Jang | H05K 1/0231 361/782 |
| 2012/0059499 | A1 * | 3/2012 | Uchikura | H05K 3/0005 700/98 |

FOREIGN PATENT DOCUMENTS

| | | | | |
|---|---|---|---|---|
| JP | 05256622 | A * | 10/1993 | |
| JP | 05267816 | A * | 10/1993 | |
| JP | H09-148791 | A | 6/1997 | |
| JP | 2000029917 | A * | 1/2000 | |
| JP | 2001-024321 | A | 1/2001 | |
| JP | 2004228253 | A * | 8/2004 | |
| JP | 2005-216889 | A | 8/2005 | |
| JP | 2007-103667 | A | 4/2007 | |
| JP | 2009-094283 | A | 4/2009 | |
| JP | 2012-069617 | A | 4/2012 | |
| JP | 2014222687 | A * | 11/2014 | |
| WO | WO-9940762 | A1 * | 8/1999 | ............. H05K 1/111 |

OTHER PUBLICATIONS

Ehara, Machine English Translation of Japanese Patent Document No. JP-2007-10367A, Published on Apr. 19, 2007, Machine Translated by https://www.j-platpat.inpit.go.jp/p0200, on May 12, 2019. (Year: 2007).*

Hisashi, Machine English Translation of Japanese Patent Document No. JP-2000-029917A, Published on Jan. 28, 2000, Machine translated by https://www.j-platpat.inpit.go.jp/p0200, on May 12, 2019. (Year: 2000).*

Masahiko et al., Machine English Translation of Japanese Patent Document No. JP-05-256622A, Published on Oct. 5, 1993, Machine Translated by https://www.j-platpat.inpit.go.jp/p0200, on May 12, 2019. (Year: 1993).*

Terumasa et al., Machine English Translation of Japanese Patent Document No. JP-2001-024321A, Published on Jan. 26, 2001, Machine Translated by https://www.j-platpat.inpit.go.jp/p0200 on May 12, 2019. (Year: 2001).*

Yoshikuni et al., Machine English Translation of Japanese Patent Document No. JP-2009-094283A, Published on Apr. 30, 2009, Machine Translated by https://www.j-platpat.inpit.go.jp/p0200 on May 12, 2019. (Year: 2009).*

International Search Report issued in PCT/JP2015/070286; dated Oct. 20, 2015.

* cited by examiner

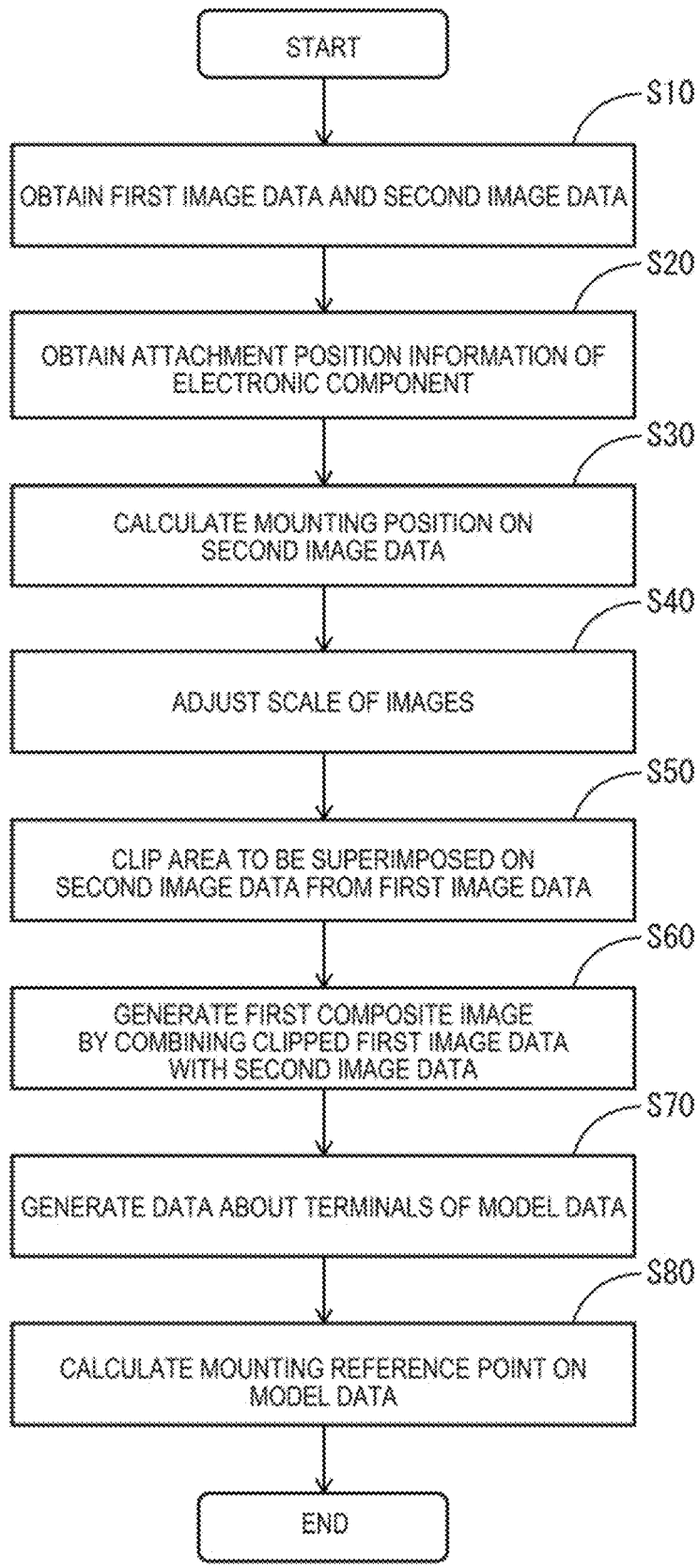

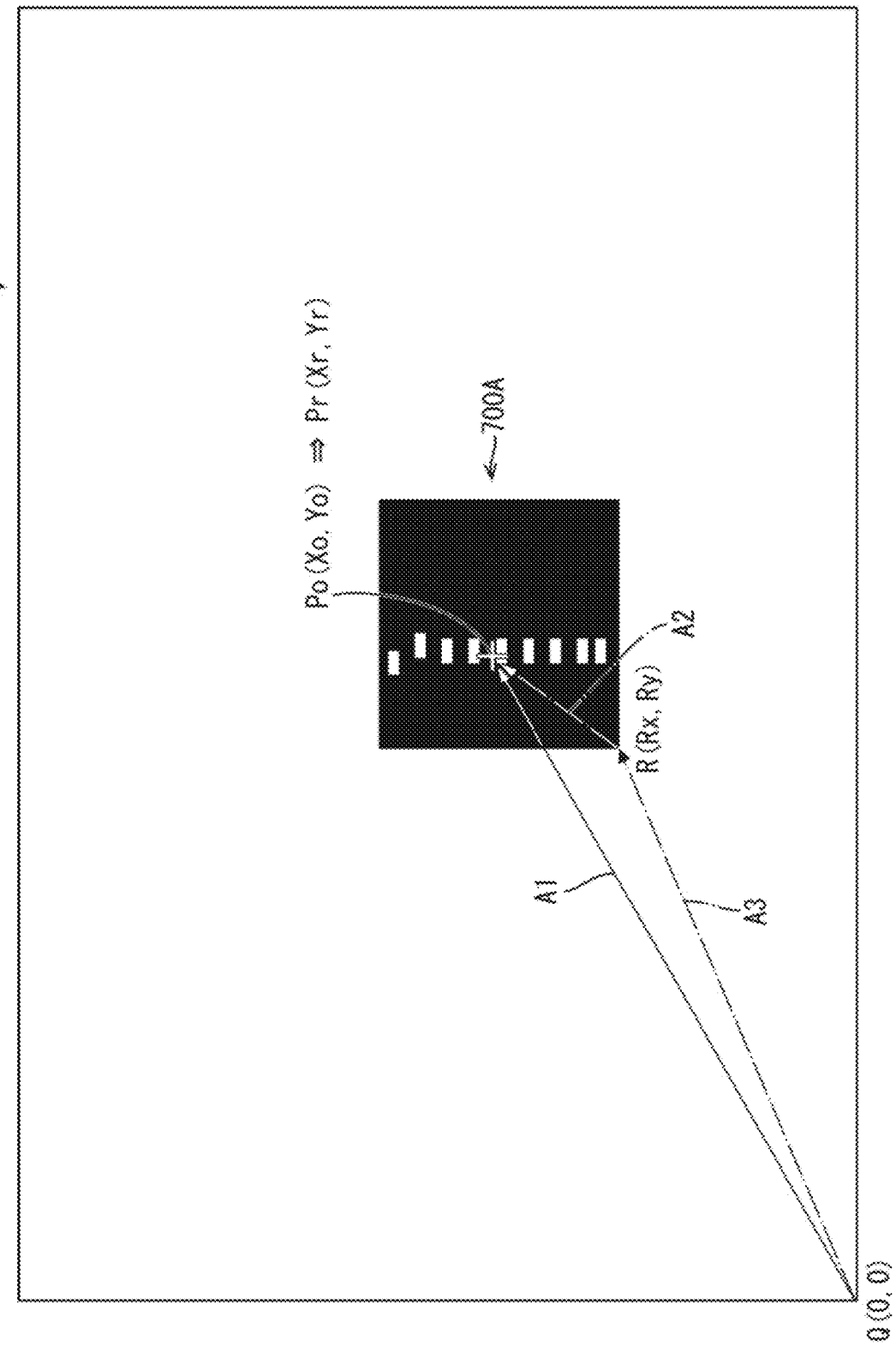

MODEL DATA GENERATION DEVICE, METHOD OF GENERATING MODEL DATA, MOUNTING REFERENCE POINT DETERMINATION DEVICE, AND METHOD OF DETERMINING MOUNTING REFERENCE POINT

CROSS-REFERENCE TO RELATED APPLICATION

This application is a National Stage of International Patent Application No. PCT/JP2015/070286, filed Jul. 15, 2015, the entire content of which is incorporated herein by reference.

TECHNICAL FIELD

The present disclosure relates to a technology of mounting an electronic component on a printed board.

BACKGROUND

Examples of electronic components to be mounted on a printed board include an electronic component having a regular shape having the center matching the center of all the terminals, such as a small outline package (SOP). The electronic component having such a regular shape is mounted at a mounting position on a printed board by using the center of the electronic component as a mounting reference point. This generally allows the terminals of the electronic component and pads of the printed board to overlap without misalignment.

Japanese Unexamined Patent Application Publication No. 2001-24321 includes the following description about a method of generating inspection data of a board. A method of generating inspection data of a board includes storing inspection information about different types of components, capturing an image of a printed board to obtain a board image, extracting an electrode image indicating electrode sections from the board image, determining a position and a type of each component, and superimposing the inspection information corresponding to the type of the component at each of the determined positions of the components.

SUMMARY

Electronic components include odd-shaped components having an asymmetry outer shape and having the center not matching the center of all the terminals. In many cases, when the odd-shaped component is mounted at a mounting position on a printed board, the mounting reference point of the odd-shaped component is unclear. In setting of the mounting reference point used in the mounting of the odd-shaped component, a test in which the odd-shaped component is mounted on the printed board needs to be carried out to find the position where the terminals and the pads overlap. This is time-consuming. Furthermore, such a process of setting the mounting reference point by the mounting test has difficulty in finding the position where the terminals and the pads completely overlap. The method needs to be improved to have higher accuracy.

The present disclosure was made in view of the above-described circumstance, and an object thereof is to set a mounting reference point of an electronic component easily with higher accuracy.

The present disclosure relates to a model data generation device configured to generate model data of an electronic component to be mounted on a printed board. The model data includes data about a terminal and data about a mounting reference point with respect to the printed board. The model data generation device is configured to determine the mounting reference point of the model data by using first image data about an electronic component captured by a camera, and second image data including information about a pad of the printed board to overlap the terminal of the electronic component and information about a mounting position of the electronic component on the printed board. The "information about a pad" includes information about a position of the pad and a shape of the pad. The "image data" is data displayable as a static image by a computer, and examples thereof include an image captured by a camera and an image generated by a computer. Accordingly, a mounting reference point of an electronic component is set easily with higher accuracy.

BRIEF DESCRIPTION OF THE DRAWINGS

FIG. 8 is a flow chart indicating a flow of generation process of model data;
FIG. 10 is a view indicating a mounting position Pr on the second image data.

DETAILED DESCRIPTION

One Embodiment

1. Overall Configuration of Surface Mounting Apparatus 1

Figure 1:
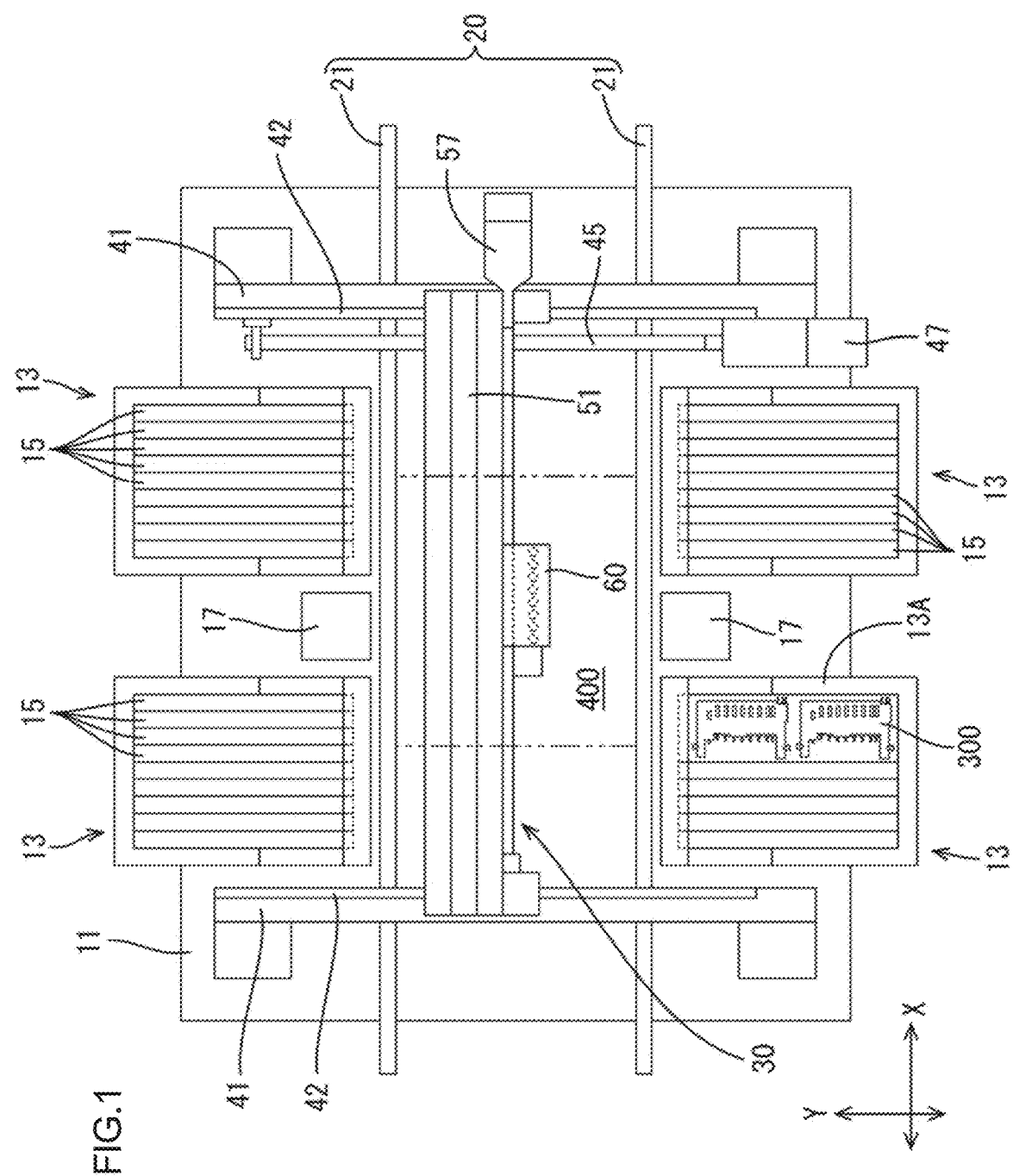
FIG. 1 is a plan view of a surface mounting apparatus applied to an exemplary embodiment.
Figure 2:
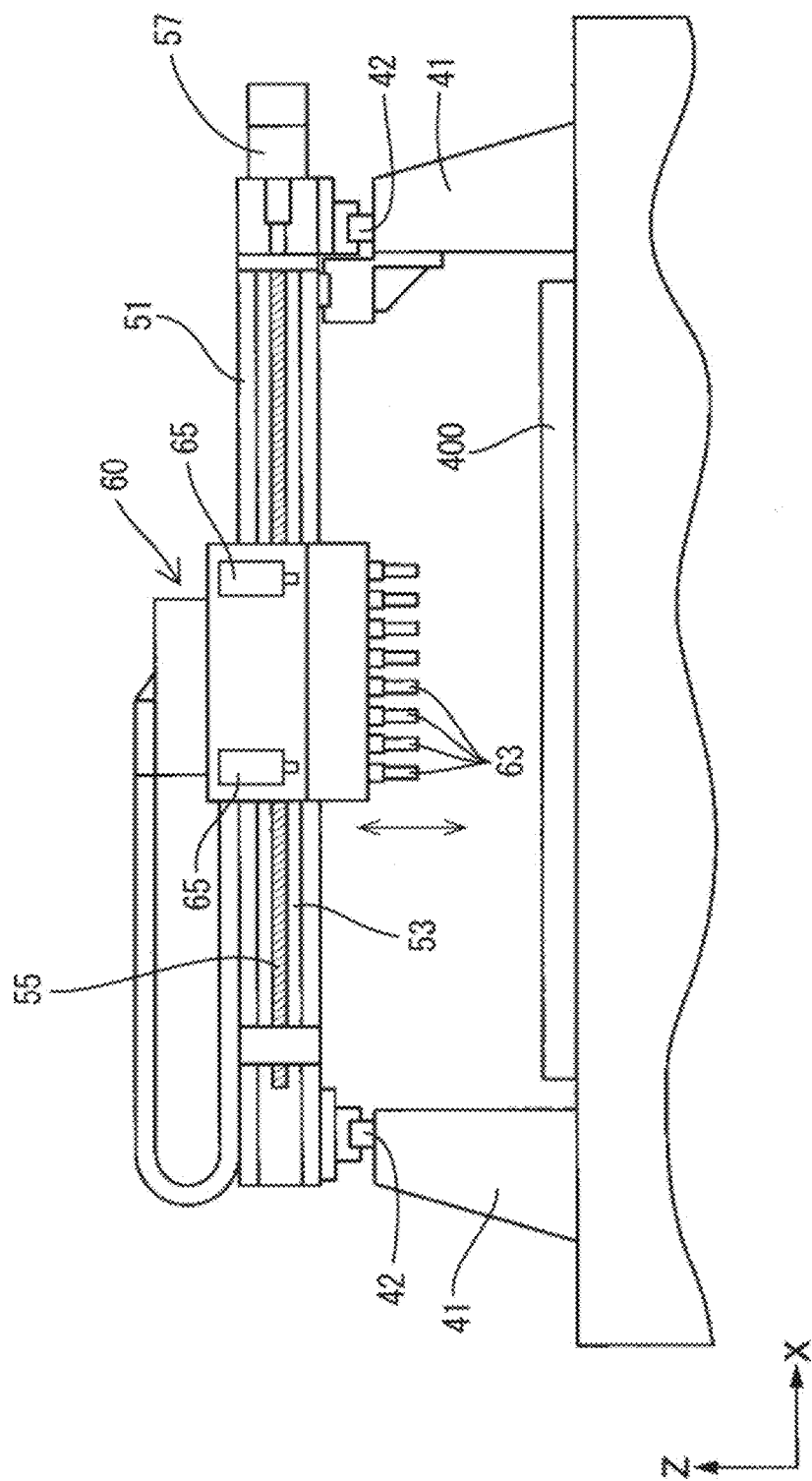
FIG. 2 is a view illustrating a supporting structure of a head unit.

As illustrated in FIG. 1, a surface mounting apparatus 1 includes a base 11, a transfer conveyer 20, which is configured to transfer a printed board 400, a head unit 60, and a drive unit 30, which is configured to move the head unit 60 in a planar direction (XY direction) on the base 11. In the following description, the longitudinal direction of the base 11 (a left-right direction in FIG. 1) is referred to as the X direction, the width direction of the base 11 (an up-down direction in FIG. 1) is referred to as the Y direction, and an up-down direction in FIG. 2 is referred to as the Z direction.

The "image data" is data displayable as a static image by a computer and includes an image captured by a camera and an image generated by a computer.

The transfer conveyor 20 is placed on a middle of the base 11. The transfer conveyor 20 includes a pair of transfer belts 21 configured to rotate in the X direction. The printed board 400 on the transfer belts 21 is moved in the X direction by friction between the belts and the printed board 400.

In this embodiment, an inlet is on the left side in FIG. 1. The printed board 400 is moved into the apparatus by the transfer conveyor 20 from the left side in FIG. 1. The printed board 400 moved into the apparatus is transferred to a mounting operation site at the middle of the base by the transfer conveyor 20 and is stopped there.

Four components feeders 13 are disposed on the base 11 so as to surround the mounting operation site. The components feeders 13 each include multiple feeders 15, which are arranged side by side and configured to feed electronic components. In addition, the component feeders 13 include a feeding area 13A from which a large-size electronic component (for example, a connector 300) is fed.

At the mounting operation site, a mounting head 63 on the head unit 60 performs a mounting process of mounting the electronic component or the connector 300, which is fed by the feeder 15, on the printed board 400. Then, the printed board 400 after the mounting process is transferred to the right in FIG. 1 by the conveyor 20 and is moved out of the apparatus.

The drive unit 30 includes, as main components, a pair of supporting legs 41, a head support 51, a Y-axis ball screw 45, a Y-axis motor 47, an X-axis ball screw 55, and an X-axis motor 57. More specifically described, as illustrated in FIG. 1, the pair of supporting legs 41 is disposed on the base 11. The supporting legs 41, which are located on the sides of the mounting operation site, extend in straight lines in the Y direction.

A guide rail 42 extending in the Y direction is disposed on an upper surface of each supporting leg 41. The head support 51 is fitted to the left and right guide rails 42 at the end portions in the longitudinal direction.

Furthermore, the Y-axis ball screw 45 extending in the Y direction is attached to the right support leg 41, and a ball nut (not illustrated) is screwed to the Y-axis ball screw 45. In addition, the Y-axis motor 47 is attached to the Y-axis ball screw 45.

Activation of the Y-axis motor 47 moves the ball nut frontward or backward along the Y-axis ball screw 45. Thus, the head support 51 fixed to the ball nut, or the head unit 60, which is described later, moves in the Y direction along the guide rails 42 (Y-axis servomechanism).

The head support 51 is long in the X direction. As illustrated in FIG. 2, a guide member 53 extending in the X direction is disposed on the head support 51, and the head unit 60 is attached to the guide member 53 in a movable manner along the axis of the guide member 53. The X-axis ball screw 55 extending in the X direction is attached to the head support 51, and a ball nut is screwed to the X-axis ball screw 55.

The X-axis motor 57 is attached to the X-axis ball screw 55. Activation of the X-axis motor 57 moves the ball nut frontward or backward along the X-axis ball screw 55. Thus, the head unit 60 fixed to the ball nut moves in the X direction along the guide member 53 (X-axis servomechanism).

Thus, when the X-axis motor 57 and the Y-axis motor 47 are controlled in combination, the head unit 60 is able to be moved in a planar direction (XY direction) over the base 11.

The head unit 60 includes mounting heads 63 to be used in the mounting operation of an electronic component and arranged in line. The mounting heads 63 are each configured to move up and down with respect to the head unit 60 due to rotation about the axis by the R-axis motor and drive of the Z-axis motor. Furthermore, a negative pressure is applied to the mounting heads 63 by a negative pressure source, which is disposed outside an area in the figure, such that suction power is generated at the front end of the head.

With this configuration, activation of the X-axis motor 57, the Y-axis motor 47, and the Z-axis motor at a predetermined timing allows an electronic component or a large-size electronic component, such as a connector 300, which is fed by the feeder 15, to be taken out by the mounting head 63 and to be mounted on the printed board 400.

Figure 3:
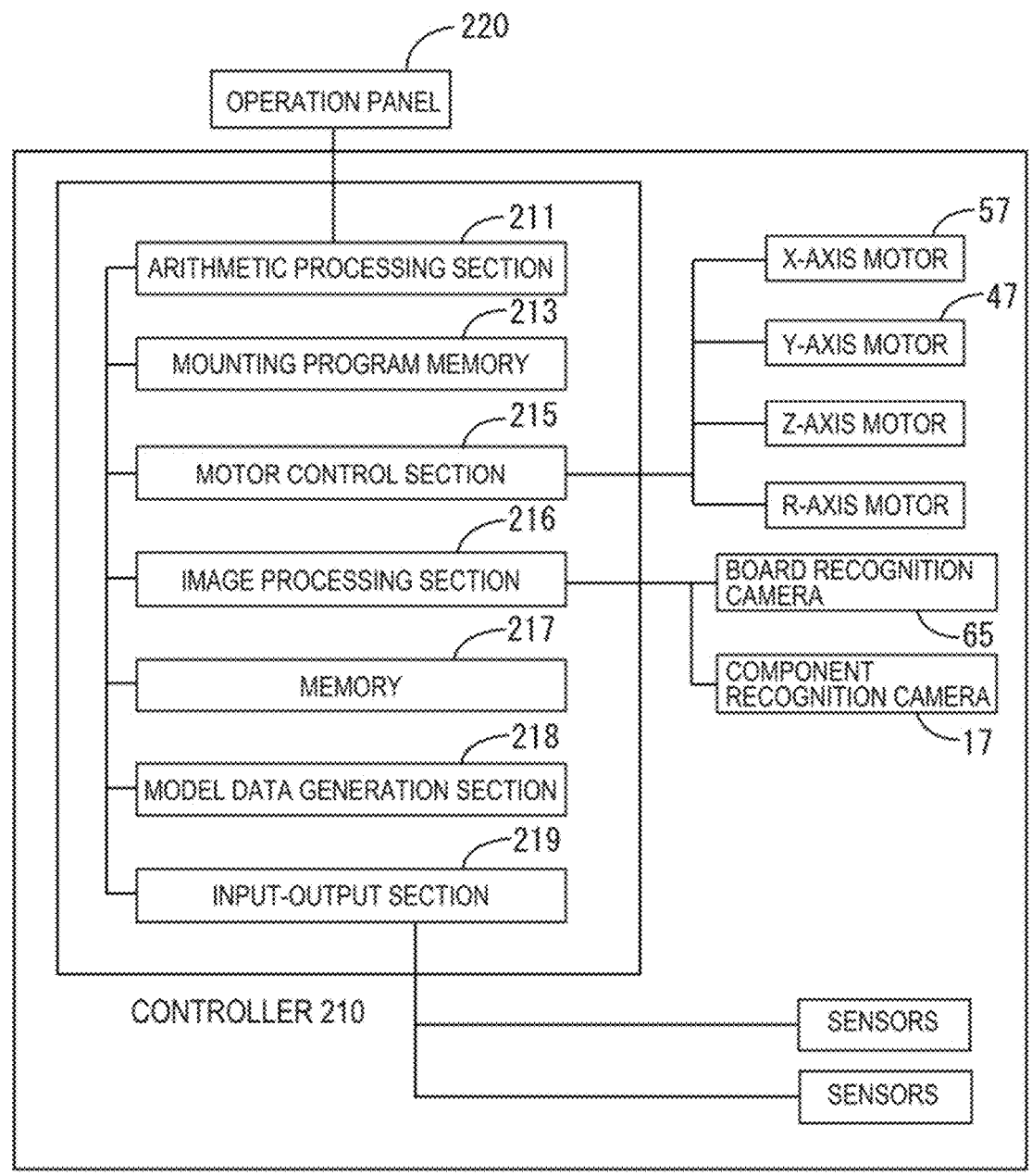
FIG. 3 is a block diagram indicating an electrical configuration of the surface mounting apparatus.

The symbols "17" in FIG. 1 denote component recognition cameras and the symbols 65 in FIG. 3 denote board recognition cameras. The component recognition cameras 17 are fixed to the base 11 with the imaging surfaces facing upward. The component recognition camera 17 is configured to take an image (a lower surface image) of the electronic component taken out by the mounting head 63 to determine the positioning of the electronic component suctioned by the mounting head 63. The board recognition cameras 65 are fixed to the head unit 60 with the imaging surfaces facing downward and are configured to move together with the head unit 60. With this configuration, activation of the X-axis servomechanism and the Y-axis servomechanism allows the board recognition camera 65 to capture an image of a predetermined portion of the printed board 400.

2. Electrical Configuration of Surface Mounting Apparatus 1

Next, an electrical configuration of the surface mounting apparatus 1 is described with reference to FIG. 3. The surface mounting apparatus 1 is totally controlled by a controller 210. The controller 210 includes an arithmetic processing section 211 including a CPU, for example, a mounting program memory 213, a motor control section 215, an image processing section 216, a memory 217, a model data generation section 218, and an input-output section 219. An operation panel 220 is connected to the arithmetic processing section 211 to enable various input operations through the operation panel 220.

The mounting program memory 213 stores a mounting program for controlling the servomechanism including the X-axis motor 57, the Y-axis motor 47, the Z-axis motor, and the R-axis motor, for example. The motor control section 215 is configured to drive the motors together with the arithmetic processing section 211 in accordance with the mounting program. The motors are electrically connected to the motor control section 215.

Furthermore, the component recognition cameras 17 and the board recognition cameras 65 are electrically connected to the image processing section 216 such that the image processing section 216 receives the image data from the cameras 17 and 65. In the image processing section 216, the component image and the board image are analyzed by using the received image data. The memory 217 is configured to store a mounting program or data required for generation of model data 500, which is described later. The data required for generation of the model data 500 includes information about a mounting position of an electronic component. The "information about a mounting position of an electronic component" is data indicating the mounting position of the electronic component on the printed board 400, i.e., coordinate data of a mounting position Po of the electronic component in which a reference point Q of the printed board 400 is used as a reference point. The "information about a mounting position of an electronic component" is known information obtained from the design of the printed board 400, for example.

The model data generation section 218 is configured to generate the model data 500 of the electronic component. The model data generation section is one example of a "model data generation device" of the present disclosure. Furthermore, the input-output section 219 is a so-called interface and is configured to receive detection signals output from sensors in the surface mounting apparatus 10. Devices other than the sensors are connectable to the input-output section 219, and various data from an external component may be input to the input-output section 219.

3. Model Data 500 and Process of Generating the Same

Figure 4:
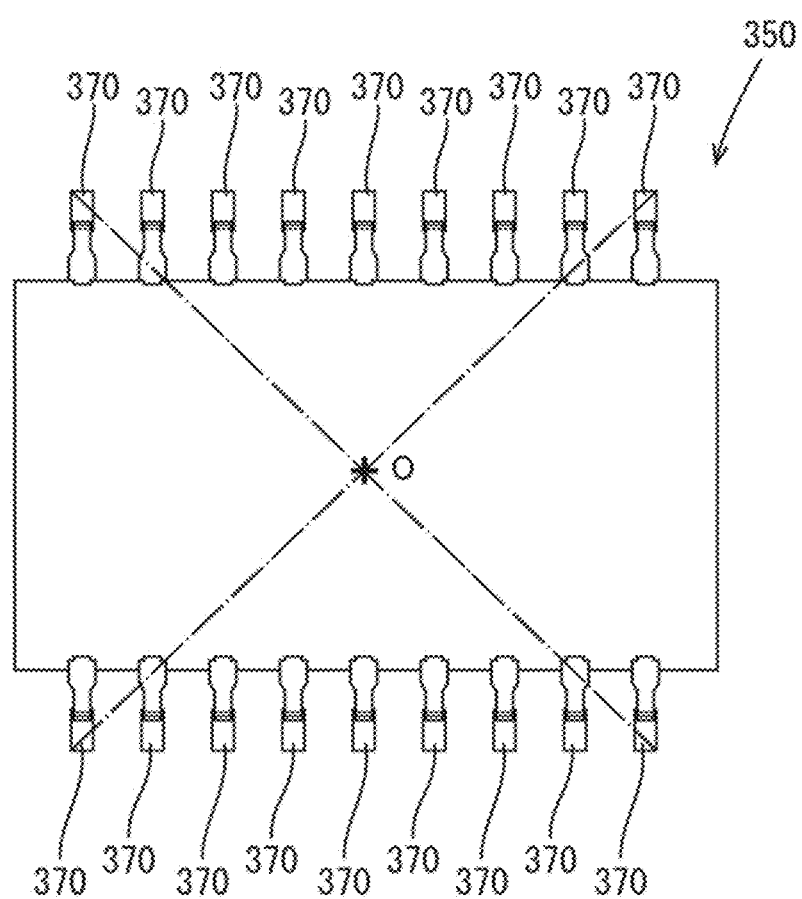
FIG. 4 is a plan view of a SOP.

Examples of electronic components to be mounted on the printed board 400 include an electronic component having a regular shape such as a small outline package (SOP) 350, which is illustrated in FIG. 4. The component center O, which is the center of the component outer shape, matches the center O of all the terminals 370. In many cases, the terminals of the electric component overlap the pads of the printed board without misalignment when the electronic component having a regular shape is mounted at the mounting position on the printed board 400 by using the center O of the terminals as the reference.

Figure 5:
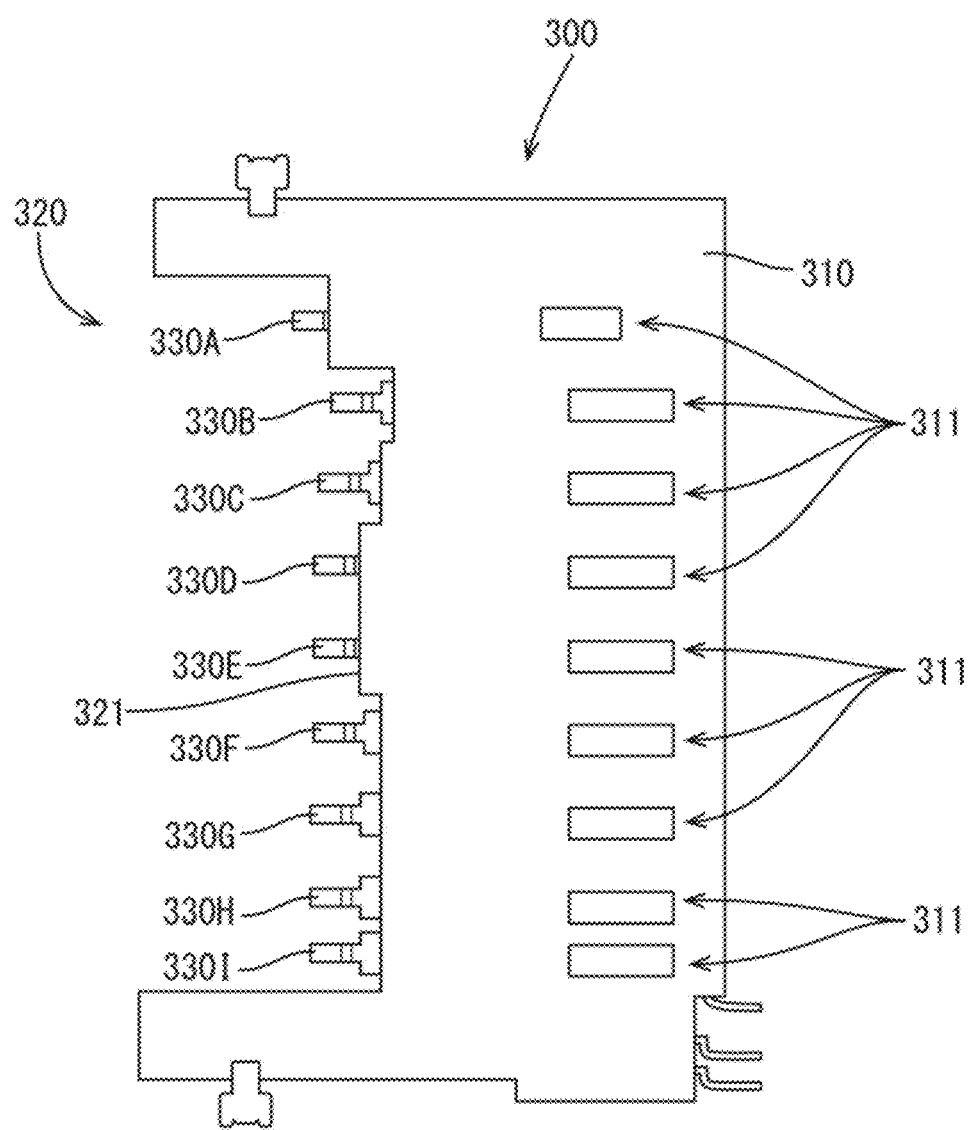
FIG. 5 is a plan view of a connector.

Examples of the electronic components also include an odd-shaped component, which has an asymmetric outer shape and has the center not matching the center of all the terminals, such as a connector 300 illustrated in FIG. 5. When the odd-shaped component is mounted on the printed board 400, the reference point of the odd-shaped component is unclear. The model data 500 is data that provides the mounting reference point of the odd-shaped component when the odd-shaped component is mounted on the printed board 400.

Hereinafter, the connector 300 is used as an example, and the process of generating the model data 500 is described with reference to FIG. 5 to FIG. 15.

As illustrated in FIG. 5, the connector 300 includes a connector body 310 and a plurality of terminals 330A to 330I. The connector body 310 is formed of a synthetic resin and has a recess 320 opening to the left in FIG. 5. The connector body 310 has a plurality of openings 311.

The recess 320 has a side surface 321 including a card insertion portion (or slot) into which a memory card (not illustrated) is inserted from the left in FIG. 5. The terminals 330 are formed of gold and include nine terminals 330A to 330I. The terminals 330 are arranged substantially in a line (an up-down direction in FIG. 5) in the recess 320 of the connector 310. The terminals 330A to 330I are arranged such that the left and right ends are substantially aligned except for the terminals 30A and 30B. The terminal 30A is slightly displaced to the left and the terminal 30B is slightly displaced to the right.

Figure 6:
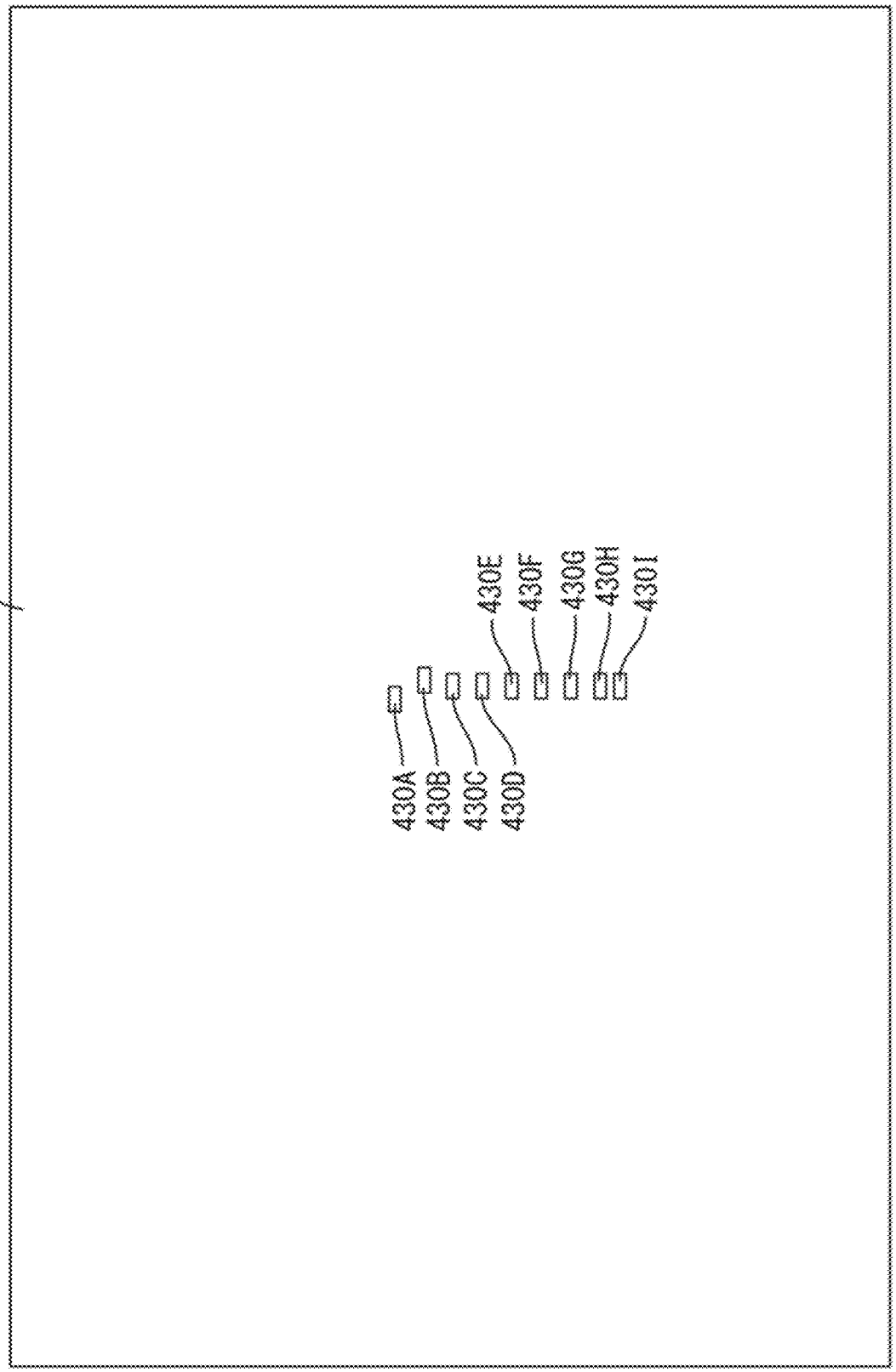
FIG. 6 is a plan view of a printed board.

FIG. 6 is a plan view of the printed board 400 on which the above-described connector 300 is to be mounted. The printed board 400 includes nine pads 430A to 430I corresponding to the nine terminals 330A to 330I of the connector 300. The printed board 400 includes other pads, which are not illustrated.

Figure 7:
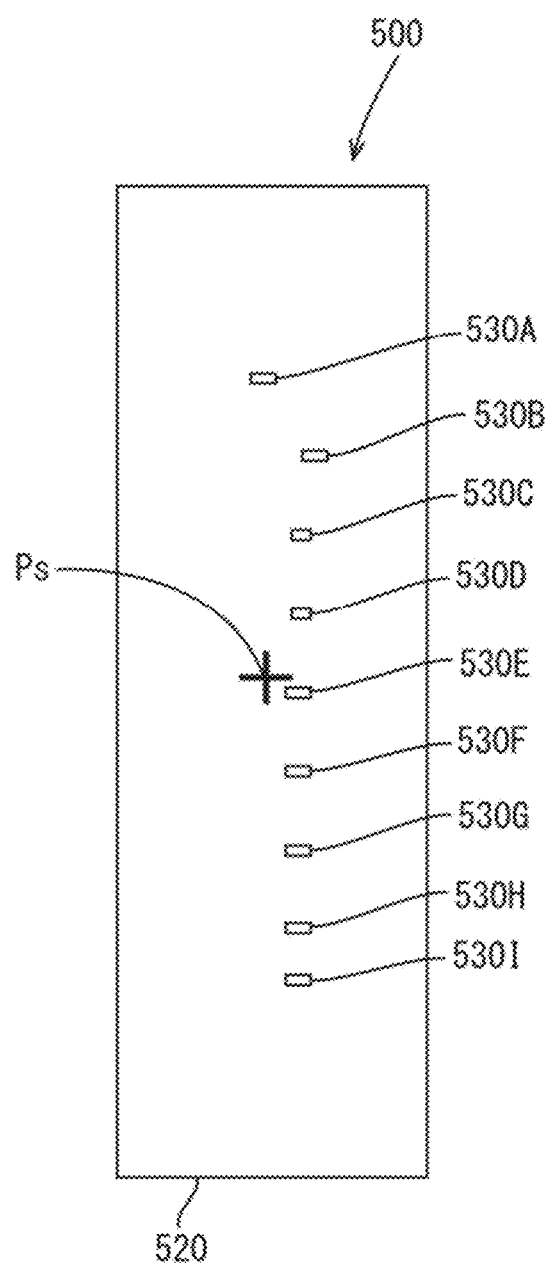
FIG. 7 is a view illustrating model data.

As illustrated in FIG. 7, the model data 500 includes data about the nine terminals 530A to 530I and data about the mounting reference point Ps. The model data 500 is generated by eight steps of S10 to S80 in FIG. 8. The process of generating the model data 500 is performed when the type of the printed board is changed, for example.

At S10, a process of obtaining "first image data 600 about the connector 300" and "second image data 700 about the pads of the printed board 400" required for generation of the model data 500, is performed. In this example, the component recognition camera 17 and the board recognition camera 65 mounted in the surface mounting apparatus 1 are used to obtain the image data 600 and 700. Thus, at S10, a process of capturing an image of the connector 300 with the component recognition camera 17 and a process of capturing an image of the pads of the printed board 400 with the board recognition camera 65 are performed.

Specifically, the head unit 60 is moved, and the connector 300 is held by the mounting head 63 by suction. Then, the connector 300 held by suction is moved to a position above the component recognition camera 17, and the component recognition camera 17 captures an image of the connector 300. The image data captured by the component recognition camera 17 is sent to the image processing section 216 where predetermined image processing is performed.

Figure 9B:
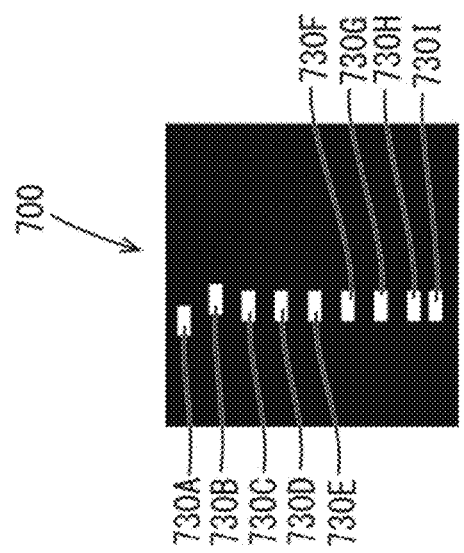
FIGS. 9A and 9B are views indicating first image data and second image data.
Figure 9A:
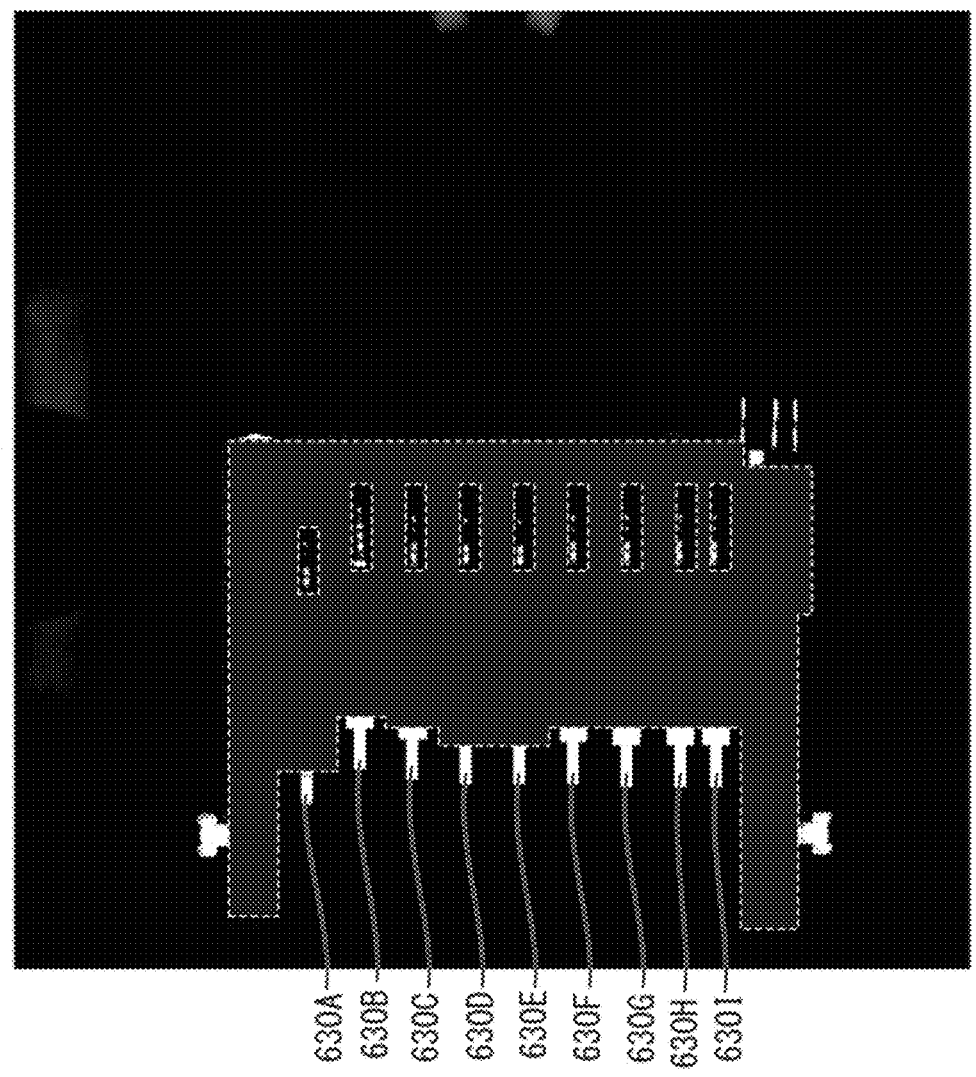

Thus, as illustrated in FIG. 9A, the first image data 600, which is image data about the connector 300, is obtained. When the image of the connector 300 is taken, light is highly reflected by the terminals and reflected little by the other sections. Thus, in the first image data 600, the terminals are white, and the other sections are black.

Furthermore, the printed board 400 is transferred to the mounting operation site by the transfer conveyor 20, and then the head unit 60 is moved to a position above the mounting operation site. Subsequently, the board recognition camera 65 mounted in the head unit 60 captures an image of the printed board 400 over a predetermined area including the pads 430A to 430I. The image data captured by the board recognition camera 65 is sent to the image processing section 216 where predetermined image processing is performed. Thus, as illustrated in FIG. 9B, the second image data 700 including pad images 730A to 730I of the pads 430 of the printed board 400 is obtained. When the image of the printed board 400 is taken, light is highly reflected by the pads and reflected little by the other sections. Thus, in the second image data 700, the pads are white, and the other sections are black.

At S20, the model data generation section 218 performs a process of retrieving "information about a mounting position of an electronic component" from the memory 217. In this example, at S20, the coordinates data (Xo, Yo) of the mounting position Po of the connector 300 with the reference point Q of the printed board 400 as the reference is retrieved from the memory 217 as the information about the mounting position of the component to generate the model data 500 of the connector 300.

In the following S30, the model data generation section 218 performs a process of calculating coordinates (Xr, Yr) of a mounting position Pr of the connector 300 on the second image date 700. Specifically, the model data generation section 218 generates a coordinate system having the reference point Q of the printed board 400 as the origin, and then locates the data about the mounting position Po of the connector 300, which is retrieved at S20, and the data about the second image data 700, which is obtained at S10, on the generated coordinate system. Thus, as illustrated in FIG. 10, image data 400A in which the mounting position Po of the connector 300 is superimposed on the second image data 700 is obtained.

Then, the coordinate data of the mounting position Po is converted from the "coordinates on the printed board 400"

to the "coordinates on the second image data 700" to calculate the coordinates (Xr, Yr) of the mounting position Pr on the second image data 700. Thus, the second image data 700 including the pad images 730A to 730I and information about the mounting position Pr of the connector 300 on the printed board 400 is obtained. The pad image 730 corresponds to the information about a pad of the present disclosure.

The above-described process can be expressed in a formula. The coordinates (Xr, Yr) of the mounting position Pr of the connector 300 on the second image data 700 are expressed by the following equations (1) and (2) by using the coordinates (Xo, Yo) of the mounting position Po on the printed board 400 and the coordinates (Rx, Ry) of the reference point R of the second image data 700 on the printed board 400.

$$Xr = Xo - Rx \qquad \text{Equation (1)}$$

$$Yr = Yo - Ry \qquad \text{Equation (2)}$$

The coordinates on the printed board 400 are coordinates with the reference point Q on the printed board 400 as the origin (0, 0). The coordinates on the second image data 700 are coordinates with the reference point R on the second image data 700 as the origin (0, 0).

Furthermore, in FIG. 10, a position vector "A1" represents a position vector of the mounting position Po with the reference point Q of the printed board 400 as the origin. In addition, a position vector "A2" represents a position vector of the mounting position Pr with the reference point R of the second image data 700 as the origin, and a position vector "A3" represents a position vector of the reference point R of the second image data 700 with the reference point Q of the printed board 400 as the origin. These three position vectors "A1", "A2", and "A3" satisfy the following relationship.

$$A2 = A1 - A3 \qquad \text{Equation (3)}$$

Subsequently, at S40, the model data generation section 218 performs a process of adjusting a scale (magnification) of the second image data 700 and a scale of (magnification) the first image data 600. That is, the magnification of the component recognition camera 17 and that of the board recognition camera 65 are different. Thus, the process of adjusting the scales is performed to equalize the magnifications of the two image data pieces of image data 600 and 700, which are captured by the cameras 17 and 65.

Figure 11B:
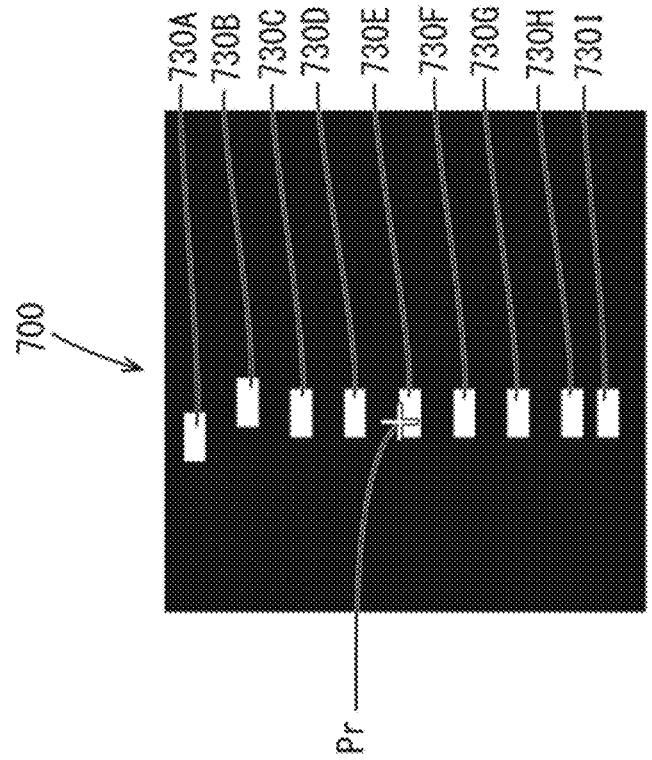
FIGS. 11A and 11B are views indicating scale adjustment of the second image data.
Figure 11A:
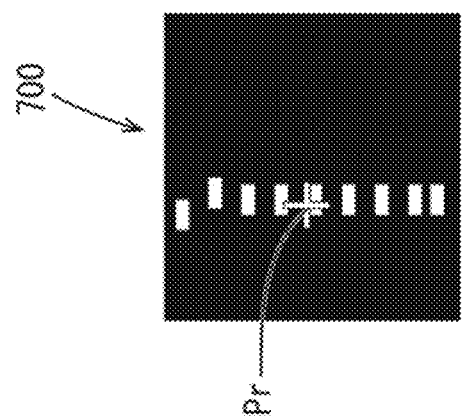

In this example, the magnification of the board recognition camera 65 is smaller than that of the component recognition camera 17. Thus, as illustrated in FIGS. 11A and 11B, the second image data 700 is enlarged for the scale adjustment. In the scale adjustment, the mounting position Pr on the second image data 700 is changed in accordance with the change in the scale.

Figure 12:
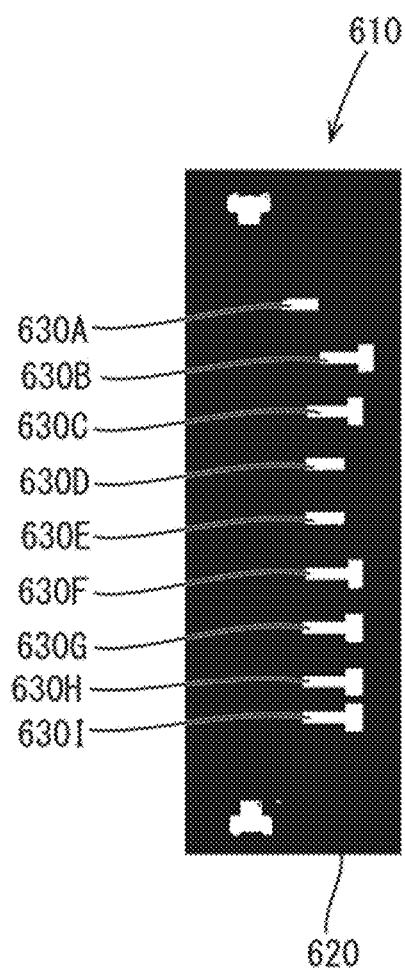
FIG. 12 is a view illustrating a portion of the first image data (an area to be superimposed on the second mage data)

Subsequently, at S50, the model data generation section 218 performs a process of clipping an area to be superimposed on the second image data 700 from the first image data 600. In this process, for example, as illustrated in FIG. 12, a rectangular area including the nine terminal images 630A to 630I are clipped from the first image data 600. An outline 620 of the clipped first image data 610 is used as an outline 520 of the model data 500.

Then, at S60, the model data generation section 218 performs a process of combining the clipped first image data 610 with the second image data 700. Specifically, a process of making the clipped first image data 610 translucent is performed first.

Figure 13:
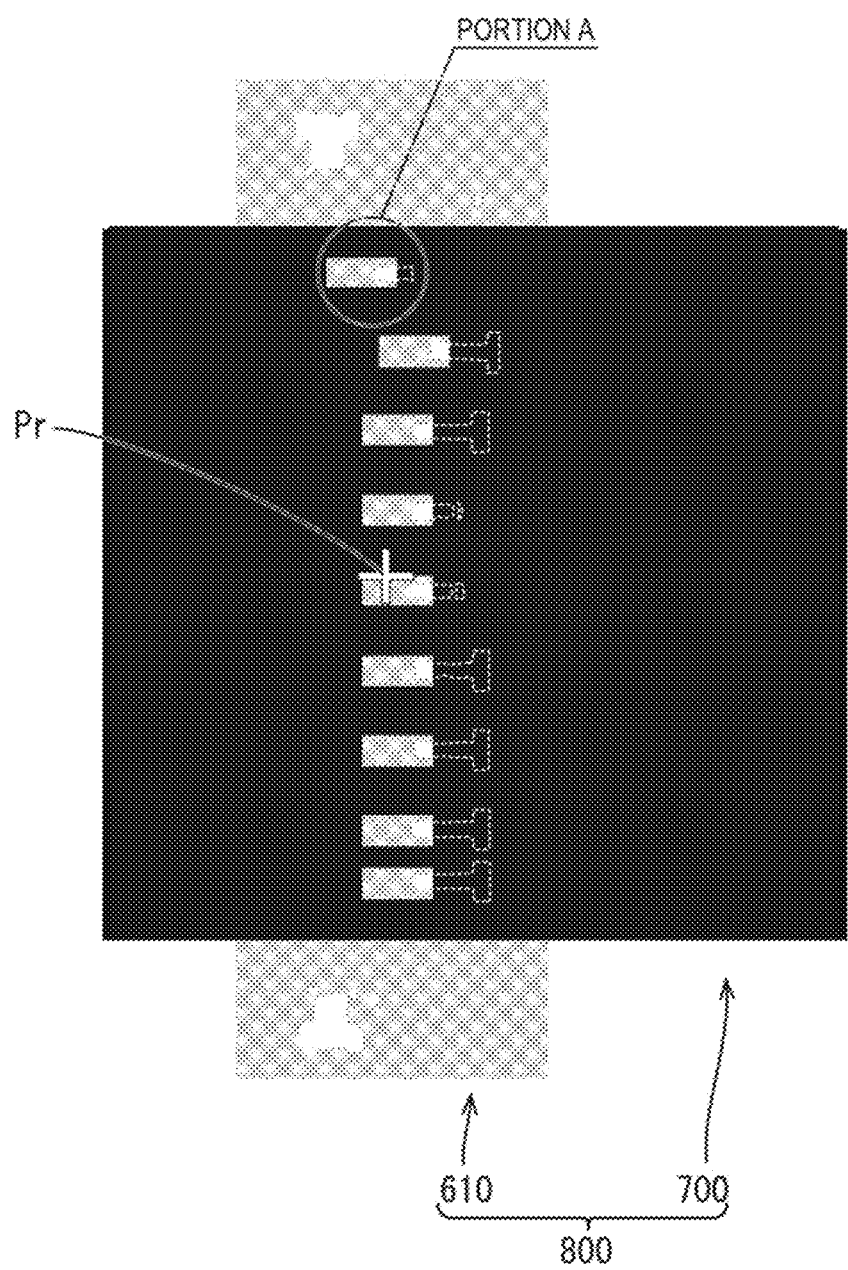
FIG. 13 is a view illustrating a first composite image in which the first image data is superimposed on the second image data.

Then, pattern matching between the two image data pieces including the image data 610 and 700 is performed such that the nine terminal images 630A to 630I in the first image data 610 overlap the nine pad images 730A to 730I in the second image data 700. Specifically, the pattern matching is performed between the two image data pieces including the image data 610 and 700 such that end portions of the terminal images 630A to 630I overlap the pad images 730A to 730I. Thus, as illustrated in FIG. 13, a first composite image 800 in which the translucent first image data 610 and the second image data 700 overlap is obtained.

Figure 14:
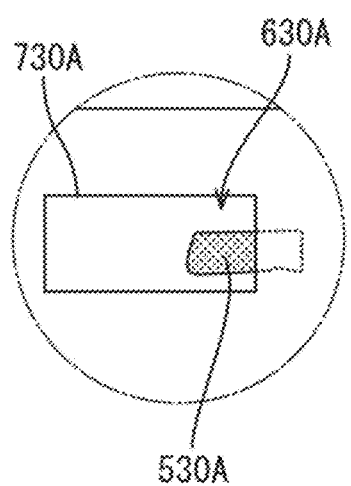
FIG. 14 is a view illustrating a portion A in FIG. 13 in a magnified state.

Then, at S70, the model data generation section 218 generates the data about the terminals 530 of the model data 500. Specifically, with respect to the first composite image 800, logical conjunction of the pad images 730 of the second image data 700 and the terminal images 630 of the clipped first image data 610 are taken to generate the data about the terminals 530. Taking the logical conjunction means extracting an area where the "pad images 730" and the "terminal images 630" overlap. For example, as illustrated in FIG. 14, the area (indicated by hatching) where the pad 730A image of the second image data 700 and the terminal image 630A of the first image data 610 overlap is extracted as the terminal 530A of the model data 500.

At S70, this process is performed for the pad images 730A to 730I and the terminal images 630A to 630I. Thus, as illustrated in FIG. 7, the data about the nine terminals 530A to 530I of the model data 500 is generated.

Figure 15:
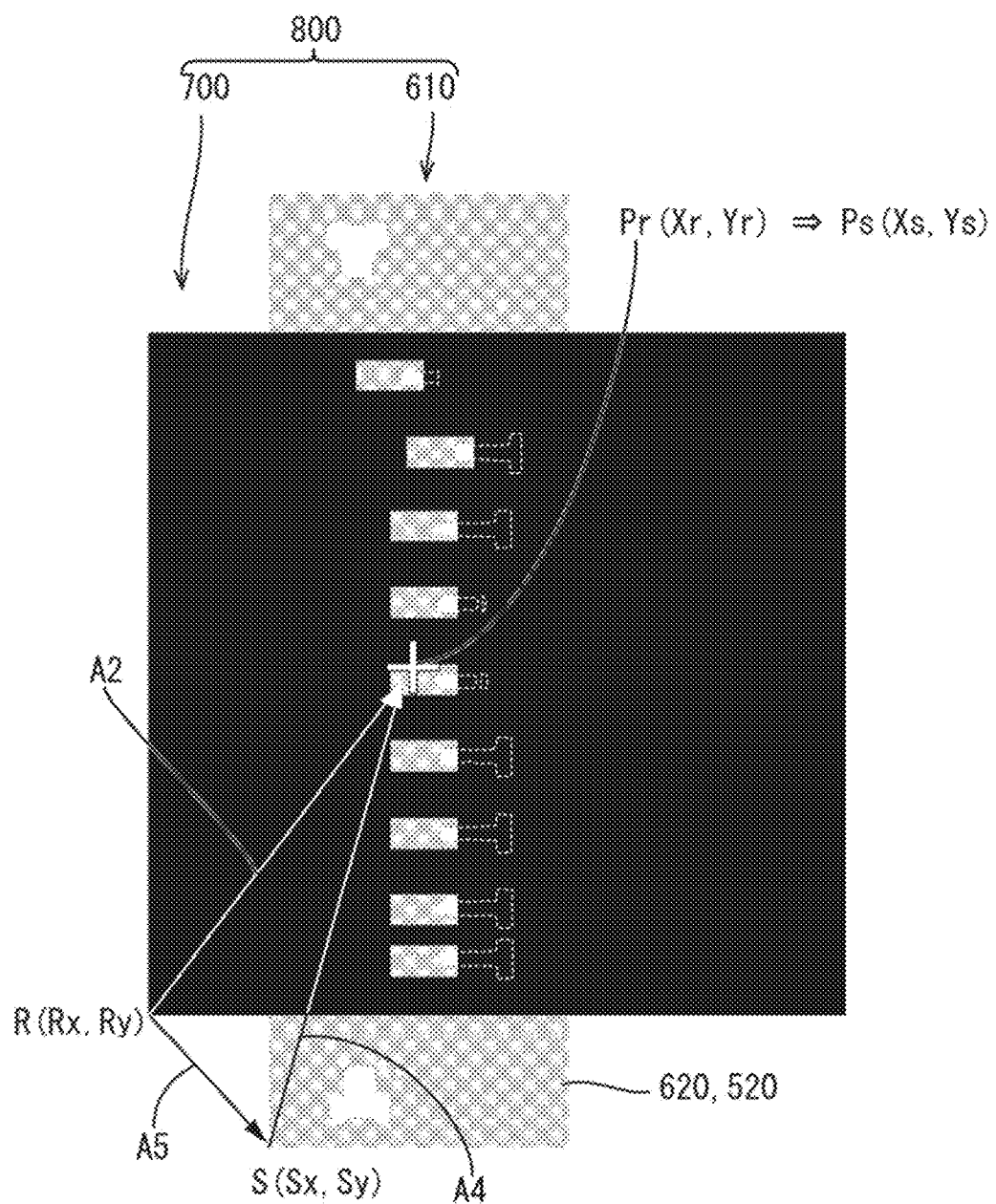
FIG. 15 is a view indicating a mounting reference point Ps on the first composite image.

Then, at S80, the model data generation section 218 performs a process of calculating coordinates (Xs, Ys) of the mounting reference point Ps on the model data 500. Specifically, as illustrated in FIG. 15, the coordinates of the mounting position Pr is converted from the "coordinates on the second image data 700" into the "coordinates on the model data 500" by using the first composite image 800 generated at S60 to calculate the coordinates (Xs, Ys) of the mounting reference point Ps on the model data 500.

The process can be expressed in a formula. The coordinates (Xs, Ys) of the mounting reference point Ps on the model data 500 is calculated by the following equations (4) and (5) by using the coordinates (Xr, Yr) of the mounting position Pr on the second image data 700, the coordinates (Rx, Ry) of the reference point R of the second image data 700, and the coordinates (Sx, Sy) of the reference point S of the model data 500.

$$Xs = (Rx - Sx) + (Xr) = (Rx - Sx) + (Xo - Rx) \qquad \text{Equation (4)}$$

$$Ys = (Ry - Sy) + (Yr) = (Ry - Sy) + (Yo - Ry) \qquad \text{Equation (5)}$$

The coordinates on the model data 500 are the coordinate data with the reference point S on the model data 500 as the origin (0, 0). In this example, the reference point S of the model data 500 is set at the bottom left corner point of the first image data 610.

Furthermore, in FIG. 15, the position vector "A2" represents a position vector of the mounting position Pr with the reference point R of the second image data 700 as the origin. In addition, a position vector A4 represents a position vector of the mounting reference point Ps with the reference point S of the model data 500 as the origin, and a position vector A5 represents a position vector of the reference point S of the first image data 610 with the reference point R of the second image data 700 as the origin. The three position vectors A2, A4, and A5 satisfy the following relationship.

$$A4 = A2 - A5 \qquad \text{Equation (6)}$$

Thus, the data about the "terminals 530A to 530I" included in the model data 500 and the data about the coordinates of the "mounting reference point Ps" are obtained. The model data 500 is generated for different types of the odd-shaped components.

4. Process of Mounting Connector 300 by Using Model Data 500

In the mounting of the connector 300 on the printed board 400, first, the connector 300 is held by the mounting head 63 by suction. Then, the head unit 60 is moved such that the connector 300 held by the mounting head 63 by suction moves to a position above the component recognition camera 17. Then, the component recognition camera 17 captures an image of the connector 300.

Thus, third image data 900 of the connector 300 is obtained. The third image data 900, which is an image of the connector 300 captured by the component recognition camera 17, is substantially the same as the first image data 600 illustrated in FIG. 9A.

Figure 16:
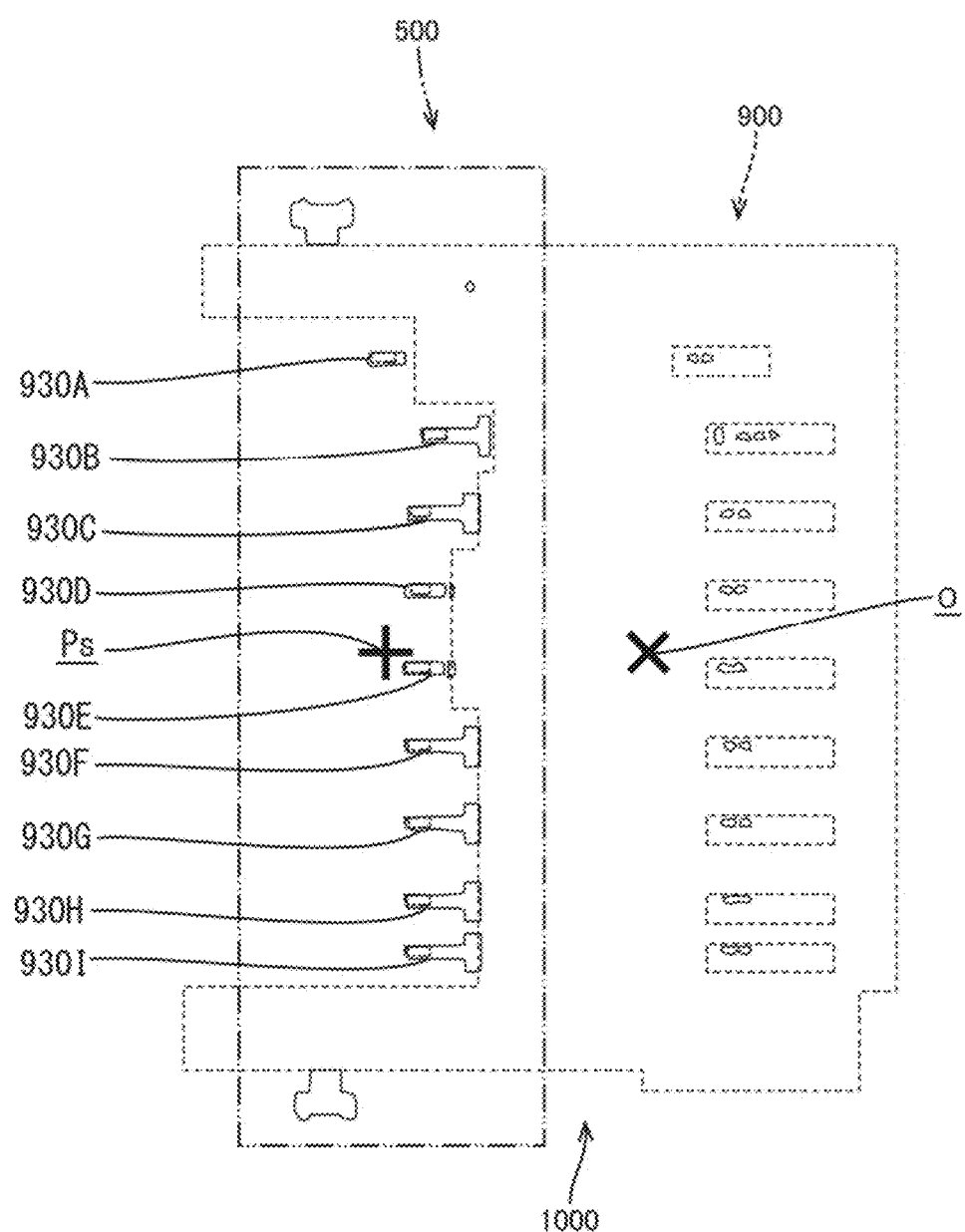
FIG. 16 is a view illustrating a second composite image in which the first image data is superimposed on a model data.

Then, the arithmetic processing section 211 generates a second composite image 1000 in which the third image data 900 is superimposed on the model data 500. Specifically, the pattern matching is performed such that end portions of the terminal images 930A to 930I in the third image data 900 match the terminals 530A to 530I in the model data 500. Thus, the second composite image 1000 in which the third image data 900 is superimposed on the model data 500 is generated as illustrated in FIG. 16.

Then, the arithmetic processing section 211 recognizes the mounting reference point Ps of the connector 300 by using the generated second composite image 1000. In other words, the mounting reference point Ps of the model data 500 in the second composite image 1000 is the mounting reference point Ps of the connector 300. In this example, the component center (the center of the outer shape) O of the connector 300 is the suction center, and the mounting reference point Ps of the connector 300 is recognized as the coordinates with the component center O as the reference (origin).

Then, the connector 300 is mounted on the printed board 400 such that the mounting reference point Ps of the connector 300 matches the mounting position Po on the printed board 400. Thus, the connector 300 is mounted on the printed board 400 without misalignment. In other words, the connector 300 is mounted such that the terminals 330A to 330I overlap the pads 430A to 430I of the printed board 400.

If the third image data 900 is tilted relative to the model data 500, the tilting is adjusted during generation of the second composite image 1000. Then, during the mounting, the tilting is corrected, and the connector 300 is mounted on the printed board 400 such that the mounting reference point Ps matches the mounting position Po.

5. Description of Effect

With respect to the mounting reference point Ps of the odd-shaped component, a mounting test in which the odd-shaped component is mounted on the printed board 400 may be carried out to find a position where the pads 430A to 430I and the terminals 330A to 330I overlap. However, such a method requires the mounting test to be carried out several times until the mounting reference point Ps is found. This is time-consuming. In addition, it is difficult to completely match the mounting position Po on the printed board 400 with the mounting reference point Ps. The method has an accuracy problem.

To solve the problem, in this embodiment, the mounting reference point Ps of the model data 500 is determined by using the first image data 600, the second image data 700, and the data about the mounting position Po on the printed board 400. This eliminates the need of the mounting test and spares time. In addition, this enables the mounting position Po on the printed board 400 and the mounting reference point Ps of the connector 300 to completely match, improving accuracy in positioning of the odd-shaped component on the printed board 400.

Furthermore, in the present embodiment, only the data about the portions of the terminal images 630A to 630I overlapping the pad images 730A to 730I is extracted as the terminals 530A to 530I of the model data 500. In this configuration, during the generation of the second composite image 1000, if the terminal images 930A to 930H of the third image data 900 properly overlap the terminals 530A to 530I of the model data 500, the terminals 330A to 330I of the connector 300 overlap the pads 430A to 430I of the printed board 400 when the mounting process is finished.

Other Embodiments

The present disclosure is not limited to the embodiments described above and illustrated by the drawings. For example, the following embodiments will be included in the technical scope of the present disclosure.

(1) In the above-described embodiment, as one example of the "second image data 700", the image data captured by the board recognition camera 65 is described. The "second image data" may be any "image data (data displayable as a static image by a computer) that can give information relating to the positions or shape of the pads on the printed board and the information about the mounting position of the electronic component". The second image data may be Gerber data used in the production of the printed board 400 or data generated with reference to the design data of the printed board 400. Alternatively, the second image data may be data generated by using the design data relating to opening sections of a metal mask used for application of solder to the printed board 400.

(2) In one example of the above-described embodiment, the component recognition camera 17 and the board recognition camera 65 mounted in the surface mounting apparatus 1 are used to obtain the "first image data 600" and the "second image data 700". The "first image data 600" and the "second image data 700" may be data obtained by a camera not mounted in the surface mounting apparatus 1.

(3) In one example of the above-described embodiment, the model data generation section 218 performs the process of combining the clipped first image data 610 with the second image data 700 (pattern matching) (S60, FIG. 13). The process of combining two image data pieces of the image data 610 and 700 (pattern matching) is not necessarily performed by the model data generation section 218, and the combining process may be performed by an operator.

(4) In one example of the above-described embodiment, the model data generation section 218 is included in the surface mounting apparatus 1, but the model data generation section 218 may be a device independent of the surface mounting apparatus 1.

(5) In one example of the above-described embodiment, the mounting reference point Ps of the model data 500 is recognized by using the first composite image 800 illustrated in FIG. 13 and FIG. 15. The model data 500 is data obtained by modeling the connector 300, and the mounting reference point Ps of the model data 500 and the mounting reference point Ps of the connector 300 are the same. Thus, the mounting reference point Ps of the connector 300 is able to be recognized by using the first composite image 800. Specifically, in the first composite image 800 illustrated in FIG. 15, the coordinates of the mounting position Pr may be converted from the "coordinates on the second image data 700" to the "coordinates on the first image data 610 of the connector 300" to determine the coordinates (Xs, Ys) of the mounting reference point Ps on the connector 300. When the mounting reference point Ps of the connector 300 is determined, generation of the model data 500 is unnecessary. The connector 300 is mounted such that the determined mounting reference point Ps matches the mounting position on the printed board. However, in such a case, the mounting reference point Ps needs to be calculated for individual connectors 300.

In short, in one example of the above-described embodiment, the mounting reference point Ps of the model data 500 is determined by using the first image data 600 of the connector 300 captured by the component recognition camera 17, the second image data 700 of the printed board 400, and the mounting position Po of the connector 300 on the printed board 400, but the mounting reference point Ps of the connector 300 may be determined by the same steps (S10 to S60 and S80). A mounting reference point determination device configured to determine the mounting reference point Ps of the connector 300 may be included in the controller 210 of the surface mounting apparatus 1 as a "mounting reference point determination section" like the model data generation section 218 (for example, in the block diagram of the surface mounting apparatus 1 in FIG. 3, the mounting reference point determination section may be included instead of the model data generation section 218), or may be a device independent of the surface mounting apparatus 1.

(6) In one example of the above-described embodiment, the bottom left corner of the printed board 400, the bottom left corner of the first image data 610, and the bottom left corner of the model data 500 are respectively denoted as the reference points Q, S, and R. However, the reference points Q, S, and R may be any points on the printed board 400, the first image data 610, and the model data 500, respectively, other than the bottom left corner.

(7) In one example of the above-described embodiment, the model data 500 is generated for the odd-shaped component, but the model data 500 may be generated for an electronic component having a regular shape such as SOP.

The invention claimed is:

1. A model data generation device configured to generate model data of an electronic component to be mounted on a printed board, the model data including data about a terminal and data about a mounting reference point with respect to the printed board, the model data generation device comprising:
a controller, configured to convert, on a composite image in which two image data pieces including first image data about an electronic component captured by a camera and second image data including information about a pad of the printed board that overlaps the terminal of the electronic component and information about a mounting position of the electronic component on the printed board are combined such that the terminal of the electronic component and the pad of the printed board overlap, coordinates of the mounting position from coordinates on the second image data into coordinates on the model data to determine the mounting reference point of the model data corresponding to the mounting position on the printed board.

2. The model data generation device according to claim 1, wherein the controller generates data about the terminal of the model data by using an area of the composite image where a terminal image in the first image data and a pad image in the second image data overlap.

3. The model data generation device according to claim 1, wherein the controller converts the coordinates of the mounting position from coordinates on the second image data into coordinates on the model data based on position vectors relating to the first image data and the second image data.

4. The model data generation device according to claim 1, wherein the controller generates control data based on the coordinates on the model data to control a surface mounting apparatus to mount the electronic component at the mounting position on the printed board.

5. A method of generating model data of an electric component to be mounted on a printed board, the model data including data about a terminal and data about a mounting reference point with respect to the printed board, the method of generating model data comprising:
converting by a controller, on a composite image in which two image data pieces including first image data about an electronic component captured by a camera and second image data including information about a pad of the printed board that overlaps the terminal of the electronic component and information about a mounting position of the electronic component on the printed board are combined such that the terminal of the electronic component and the pad of the printed board overlap, coordinates of the mounting position from coordinates on the second image data into coordinates on the model data to determine the mounting reference point of the model data corresponding to the mounting position on the printed board.

6. The method of generating model data of an electric component to be mounted on a printed board according to claim 5, further comprising:
generating, by the controller, the data about the terminal of the model data by using an area of the composite image where a terminal image in the first image data and a pad image in the second image data overlap.

7. The method of generating model data of an electric component to be mounted on a printed board according to claim 5, wherein:
the converting of the coordinates of the mounting position from coordinates on the second image data into coordinates on the model data is based on position vectors relating to the first image data and the second image data.

8. The method of generating model data of an electric component to be mounted on a printed board according to claim 5, further comprising:
generating, by the controller, control data based on the coordinates on the model data to control a surface mounting apparatus to mount the electronic component at the mounting position on the printed board.

9. A mounting reference point determination device configured to determine a mounting reference point of an electric component to be mounted on a printed board, the mounting reference point generation device comprising:
a controller configured to convert, on a composite image in which two image data pieces including first image data about an electronic component captured by a camera and second image data including information about a pad of the printed board that overlaps the terminal of the electronic component and information about a mounting position of the electronic component on the printed board are combined such that the terminal of the electronic component and the pad of the printed board overlap, coordinates of the mounting position from coordinates on the second image data into coordinates on the first image data to determine the mounting reference point of the model data corresponding to the mounting position on the printed board.

10. The mounting reference point determination device according to claim 9, wherein the controller generates control data based on the coordinates on the first image data to control a surface mounting apparatus to mount the electronic component at the mounting position on the printed board.

11. A method of determining a mounting reference point of an electronic component to be mounted on a printed board, the method comprising:
converting by a controller, on a composite image in which two image data pieces including first image data about an electronic component captured by a camera and second image data including information about a pad of the printed board that overlaps the terminal of the electronic component and information about a mounting position of the electronic component on the printed board are combined such that the terminal of the electronic component and the pad of the printed board overlap, coordinates of the mounting position from coordinates on the second image data into coordinates on the first image data to determine the mounting reference point of the model data corresponding to the mounting position on the printed board.

12. The method of determining a mounting reference point of an electronic component to be mounted on a printed board according to claim 11, further comprising:
generating, by the controller, control data based on the coordinates on the first image data to control a surface mounting apparatus to mount the electronic component at the mounting position on the printed board.

* * * * *